(12) United States Patent
Arumugam et al.

(10) Patent No.: US 11,729,094 B2
(45) Date of Patent: Aug. 15, 2023

(54) SOURCE-BASED ROUTING FOR VIRTUAL DATACENTERS

(71) Applicant: VMware, Inc., Palo Alto, CA (US)

(72) Inventors: Ganes Kumar Arumugam, Sunnyvale, CA (US); Vijai Coimbatore Natarajan, San Jose, CA (US); Harish Kanakaraju, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/366,676

(22) Filed: Jul. 2, 2021

(65) Prior Publication Data
US 2023/0006920 A1    Jan. 5, 2023

(51) Int. Cl.
*H04L 45/00* (2022.01)
*H04L 61/25* (2022.01)
(Continued)

(52) U.S. Cl.
CPC .......... *H04L 45/34* (2013.01); *H04L 12/4641* (2013.01); *H04L 45/74* (2013.01); *H04L 47/12* (2013.01); *H04L 61/25* (2013.01)

(58) Field of Classification Search
CPC ..... H04L 45/64; H04L 12/4633; H04L 12/66; H04L 45/74; H04L 45/02; H04L 67/1095;
(Continued)

(56) References Cited

U.S. PATENT DOCUMENTS

| 8,830,835 B2 | 9/2014 | Casado et al. |
| 8,964,767 B2 | 2/2015 | Koponen et al. |

(Continued)

FOREIGN PATENT DOCUMENTS

| CN | 111478850 A | 7/2020 |
| WO | 2013026050 A1 | 2/2013 |

(Continued)

OTHER PUBLICATIONS

Non-Published Commonly Owned U.S. Appl. No. 17/091,734 (H053.02), filed Nov. 6, 2020, 42 pages, VMware, Inc.

(Continued)

*Primary Examiner* — Djenane M Bayard
(74) *Attorney, Agent, or Firm* — Adeli LLP

(57) ABSTRACT

Some embodiments provide a method that configures a virtual datacenter that includes a set of workloads executing on hosts in a public cloud and an edge gateway executing on a particular host for handling data traffic between the workloads and different external entities having different sets of network addresses. The method configures a router to execute on the particular host to route data messages between the edge gateway and an underlay network of the public cloud. The router has at least two different interfaces for exchanging data messages with the edge gateway, each router interface corresponding to an interface of the edge gateway. The edge gateway interfaces enable the edge gateway to perform different sets of services on data messages between the workloads and the external entities. The method configures the router to route traffic received from the external entities and addressed to the workloads based on source network addresses.

21 Claims, 6 Drawing Sheets

(51) Int. Cl.
*H04L 45/74* (2022.01)
*H04L 12/46* (2006.01)
*H04L 47/12* (2022.01)

(58) Field of Classification Search
CPC ..... H04L 45/306; H04L 45/42; H04L 45/586; H04L 63/20; H04L 67/63; H04L 67/10; H04L 45/22; H04L 45/745; H04L 67/12; H04L 9/3231; H04L 67/1001; H04L 45/38; H04L 63/0861; H04L 41/122; H04L 45/44; H04L 45/28; H04L 41/5041; H04L 61/103; H04L 12/4641; H04L 45/34; H04L 47/12; H04L 61/25; H04L 61/2514

See application file for complete search history.

(56) References Cited

U.S. PATENT DOCUMENTS

| | | | |
|---|---|---|---|
| 9,137,052 | B2 | 9/2015 | Koponen et al. |
| 9,209,998 | B2 | 12/2015 | Casado et al. |
| 9,288,081 | B2 | 3/2016 | Casado et al. |
| 9,444,651 | B2 | 9/2016 | Koponen et al. |
| 9,755,960 | B2 | 9/2017 | Moisand et al. |
| 9,876,672 | B2 | 1/2018 | Casado et al. |
| 9,935,880 | B2 | 4/2018 | Hammam et al. |
| 10,091,028 | B2 | 10/2018 | Koponen et al. |
| 10,193,708 | B2 | 1/2019 | Koponen et al. |
| 10,735,263 | B1 | 8/2020 | McAlary et al. |
| 10,754,696 | B1 | 8/2020 | Chinnam et al. |
| 10,931,481 | B2 | 2/2021 | Casado et al. |
| 11,005,710 | B2 | 5/2021 | Garg et al. |
| 11,005,963 | B2 | 5/2021 | Maskalik et al. |
| 11,171,878 | B1 | 11/2021 | Devireddy et al. |
| 11,212,238 | B2 | 12/2021 | Cidon et al. |
| 11,240,203 | B1 | 2/2022 | Eyada |
| 11,362,992 | B2 | 6/2022 | Devireddy et al. |
| 2011/0126197 | A1* | 5/2011 | Larsen ............ G06F 9/45533 718/1 |
| 2011/0131338 | A1 | 6/2011 | Hu |
| 2012/0054624 | A1* | 3/2012 | Owens, Jr. ............ G06F 9/5072 718/1 |
| 2012/0110651 | A1* | 5/2012 | Van Biljon ............ H04L 63/102 709/201 |
| 2013/0044641 | A1 | 2/2013 | Koponen et al. |
| 2013/0044751 | A1 | 2/2013 | Casado et al. |
| 2013/0044752 | A1 | 2/2013 | Koponen et al. |
| 2013/0044761 | A1 | 2/2013 | Koponen et al. |
| 2013/0044762 | A1 | 2/2013 | Casado et al. |
| 2013/0044763 | A1 | 2/2013 | Koponen et al. |
| 2013/0044764 | A1 | 2/2013 | Casado et al. |
| 2013/0142203 | A1 | 6/2013 | Koponen et al. |
| 2013/0185413 | A1 | 7/2013 | Beaty et al. |
| 2013/0283364 | A1* | 10/2013 | Chang ............ G06F 9/45558 726/12 |
| 2014/0282525 | A1 | 9/2014 | Sapuram et al. |
| 2014/0334495 | A1 | 11/2014 | Stubberfield et al. |
| 2014/0376367 | A1 | 12/2014 | Jain et al. |
| 2015/0113146 | A1 | 4/2015 | Fu |
| 2015/0193246 | A1* | 7/2015 | Luft ................ G06F 9/45533 718/1 |
| 2016/0105392 | A1 | 4/2016 | Thakkar et al. |
| 2016/0127202 | A1 | 5/2016 | Dalvi et al. |
| 2016/0170809 | A1 | 6/2016 | Schmidt et al. |
| 2016/0182336 | A1 | 6/2016 | Doctor et al. |
| 2016/0234161 | A1 | 8/2016 | Banerjee et al. |
| 2017/0033924 | A1 | 2/2017 | Jain et al. |
| 2017/0063673 | A1 | 3/2017 | Maskalik et al. |
| 2017/0195517 | A1 | 7/2017 | Seetharaman et al. |
| 2017/0353351 | A1 | 12/2017 | Cheng et al. |
| 2018/0287902 | A1 | 10/2018 | Chitalia et al. |
| 2018/0295036 | A1 | 10/2018 | Krishnamurthy et al. |
| 2018/0332001 | A1 | 11/2018 | Ferrero et al. |
| 2019/0104051 | A1 | 4/2019 | Cidon et al. |
| 2019/0149360 | A1 | 5/2019 | Casado et al. |
| 2019/0149463 | A1 | 5/2019 | Bajaj et al. |
| 2019/0327112 | A1 | 10/2019 | Nandoori et al. |
| 2019/0342179 | A1* | 11/2019 | Barnard ................ H04L 41/12 |
| 2021/0067375 | A1 | 3/2021 | Cidon et al. |
| 2021/0067439 | A1 | 3/2021 | Kommula et al. |
| 2021/0067468 | A1 | 3/2021 | Cidon et al. |
| 2021/0075727 | A1 | 3/2021 | Chen et al. |
| 2021/0112034 | A1 | 4/2021 | Sundararajan et al. |
| 2021/0126860 | A1 | 4/2021 | Ramaswamy et al. |
| 2021/0136140 | A1 | 5/2021 | Tidemann et al. |
| 2021/0184898 | A1 | 6/2021 | Koponen et al. |
| 2021/0314388 | A1 | 10/2021 | Zhou et al. |
| 2021/0359948 | A1 | 11/2021 | Durrani et al. |
| 2022/0094666 | A1 | 3/2022 | Devireddy et al. |
| 2022/0311707 | A1 | 9/2022 | Patel et al. |
| 2022/0311714 | A1 | 9/2022 | Devireddy et al. |
| 2022/0377009 | A1 | 11/2022 | Raman et al. |
| 2022/0377020 | A1 | 11/2022 | Sadasivan et al. |
| 2022/0377021 | A1 | 11/2022 | Sadasivan et al. |

FOREIGN PATENT DOCUMENTS

| | | |
|---|---|---|
| WO | 2022060464 A1 | 3/2022 |
| WO | 2022250735 A1 | 12/2022 |

OTHER PUBLICATIONS

Non-Published Commonly Owned U.S. Appl. No. 17/212,662 (H063), filed Mar. 25, 2021, 37 pages, VMware, Inc.
Non-published commonly owned U.S. Appl. No. 17/344,956 (H061.01), filed Jun. 11, 2021, 61 pages, VMware, Inc.
Non-published commonly owned U.S. Appl. No. 17/344,958 (H061.02), filed Jun. 11, 2021, 62 pages, VMware, Inc.
Non-published commonly owned U.S. Appl. No. 17/344,959 (H061.03), filed Jun. 11, 2021, 61 pages, VMware, Inc.
Non-Published Commonly Owned U.S. Appl. No. 17/365,960, filed Jul. 1, 2021, 32 pages, VMware, Inc.

* cited by examiner

SOURCE-BASED ROUTING FOR VIRTUAL DATACENTERS

BACKGROUND

More and more enterprises have moved or are in the process of moving large portions of their computing workloads into various public clouds (e.g., Amazon Web Services (AWS), Google Cloud Platform (GCP), Microsoft Azure, etc.). Some of these public clouds enable a tenant to configure a virtual datacenter within the public cloud, with a portion of the public cloud (i.e., a set of host computers) fully allocated to that tenant's virtual datacenter. The tenant will often want this virtual datacenter to be able to connect with various external components, such as the Internet, an on-premises network, etc. However, if different services are applied to traffic sent to and received from different external components, then the virtual datacenter will need to be able to differentiate between different types of traffic sent to the same destinations.

BRIEF SUMMARY

Some embodiments provide a method for configuring a virtual datacenter on a set of host computers in a public cloud, such that the virtual datacenter can communicate with different external entities. In some embodiments, a router between an edge gateway of the virtual datacenter and an underlay network of the public cloud (e.g., executing on the same host computer as the edge gateway) is configured to route different incoming data messages to different interfaces of the edge gateway based on different source addresses of the incoming data messages that are associated with different external entities. The edge gateway is configured to apply different sets of services to data messages received at these different interfaces, thereby enabling the edge gateway to apply different sets of services to data traffic received from different external entities.

In some embodiments, the virtual datacenter is defined within virtual private clouds (VPCs) of the public cloud. A VPC, in some embodiments, is a set of workloads that are allocated to the tenant of the public cloud (e.g., an enterprise) and that are isolated from workloads of other tenants. In some embodiments, for a virtual datacenter, the tenant VPC is allocated a set of physical host computers of the public cloud that only host workload data compute nodes (e.g., virtual machines (VMs), containers, etc.) that are part of the tenant virtual datacenter (i.e., the physical host computers are not shared with other tenants of the public cloud). Within the VPC, a tenant logical network is defined, to which both the management components and the endpoint workloads connect.

The workloads of the virtual datacenter, in some embodiments, include a set of network management components (e.g., network manager(s) and/or controller(s), compute manager(s), etc.), a set of network endpoints (e.g., on which applications operate), and an edge gateway (e.g., a virtual machine) that executes on a particular host computer and processes data traffic between the workloads of the virtual datacenter and the external entities. The network management components of the virtual datacenter manage the network endpoint workloads and configure the host computers (e.g., managed forwarding elements executing on the host computers) to implement a logical network for communication between the network endpoint workloads.

As the virtual datacenter operates on a set of host computers in a public cloud, the edge gateway of the virtual datacenter is an interface between the virtual datacenter and an underlay network of the public cloud (i.e., the public cloud physical network). The virtual datacenter workloads communicate with various external entities through this underlay network. Some embodiments configure a router between the edge gateway and the public cloud underlay network, executing on the same particular host computer as the edge gateway (e.g., in the virtualization software of that host computer).

As mentioned, the edge gateway is configured with multiple different interfaces corresponding to multiple different external entities with which the virtual datacenter workloads exchange traffic. Some embodiments configure the edge gateway to perform different sets of services on data traffic depending on which of these interfaces the traffic is being sent out (for outgoing traffic) of or received through (for incoming traffic). That is, the edge gateway performs different sets of services for traffic sent to or received from different external entities. These external entities can include the workloads of one or more on-premises datacenters (e.g., enterprise datacenters managed by the public cloud tenant), public cloud provider services (e.g., storage, etc.), public Internet traffic, and/or other entities.

In general, the virtual datacenter workloads, on-premises datacenter workloads, and public cloud provider services will each have their own separate associated sets of network addresses (i.e., one or more associated subnets), with network addresses outside of these subnets assumed to be associated with the public Internet traffic. When the edge gateway receives traffic from the virtual datacenter workloads directed to any of these external entities, the edge gateway routes the traffic to the local router via the interface associated with the destination address (e.g., a first interface associated with on-premises traffic, a second interface associated with cloud provider services traffic, and a third interface associated with Internet traffic). The edge gateway can then perform the correct set of services (e.g., firewall, network address translation (NAT), VPN, etc.) on the traffic. This traffic is sent to the local router through the correct interface, which uses its own routing table to route the outgoing traffic to the cloud provider underlay network.

In many cases, while the edge gateway applies source NAT to traffic directed to the public Internet, no such address translation is applied to traffic being sent to either the on-premises datacenter workloads or to public cloud provider services. While this is not a problem for routing outbound traffic, the local router needs to be able to route traffic from the on-premises datacenter workloads and the public cloud provider services to different interfaces of the edge gateway even when these data messages have the same destination address (i.e., a virtual datacenter workload address), so that the edge gateway receives the traffic through the appropriate interface and therefore applies the appropriate set of services to each data message.

Thus, some embodiments configure the local router to use source address-based routing for these incoming data messages. These routes, in some embodiments, specify that any data message received at the local router that (i) has a destination address associated with the virtual datacenter workloads and (ii) has a source address associated with a particular external entity is routed to the edge gateway interface associated with that external entity. That is, traffic directed to the virtual datacenter workloads having a source address associated with the on-premises datacenter is routed by the local router to the on-premises interface of the edge gateway, while traffic directed to the virtual datacenter workloads having a source address associated with the public cloud provider services is routed by the local router to the public cloud provider services interface of the edge gateway. Traffic received from the public internet does not have a specific associated set of network addresses, in some embodiments, and thus any traffic directed to the virtual datacenter destination address the source address of which is not associated with any of the other interfaces is routed to the public Internet interface of the edge gateway. The edge gateway can then apply the correct set of services to the incoming data messages based on the interface through which these data messages are received.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for configuring a virtual datacenter on a set of host computers in a public cloud, such that the virtual datacenter can communicate with different external entities. In some embodiments, a router between an edge gateway of the virtual datacenter and an underlay network of the public cloud (e.g., executing on the same host computer as the edge gateway) is configured to route different incoming data messages to different interfaces of the edge gateway based on different source addresses of the incoming data messages that are associated with different external entities. The edge gateway is configured to apply different sets of services to data messages received at these different interfaces, thereby enabling the edge gateway to apply different sets of services to data traffic received from different external entities.

In some embodiments, the virtual datacenter is defined within virtual private clouds (VPCs) of the public cloud. A VPC, in some embodiments, is a set of workloads that are allocated to the tenant of the public cloud (e.g., an enterprise) and that are isolated from workloads of other tenants. In some embodiments, for a virtual datacenter, the tenant VPC is allocated a set of physical host computers of the public cloud that only host workload data compute nodes (e.g., virtual machines (VMs), containers, etc.) that are part of the tenant virtual datacenter (i.e., the physical host computers are not shared with other tenants of the public cloud). Within the VPC, a tenant logical network is defined, to which both the management components and the endpoint workloads connect.

The workloads of the virtual datacenter, in some embodiments, include a set of network management components (e.g., network manager(s) and/or controller(s), compute manager(s), etc.), a set of network endpoints (e.g., on which applications operate), and an edge gateway (e.g., a virtual machine) that executes on a particular host computer and processes data traffic between the workloads of the virtual datacenter and the external entities. The network management components of the virtual datacenter manage the network endpoint workloads and configure the host computers (e.g., managed forwarding elements executing on the host computers) to implement a logical network for communication between the network endpoint workloads.

Figure 1:
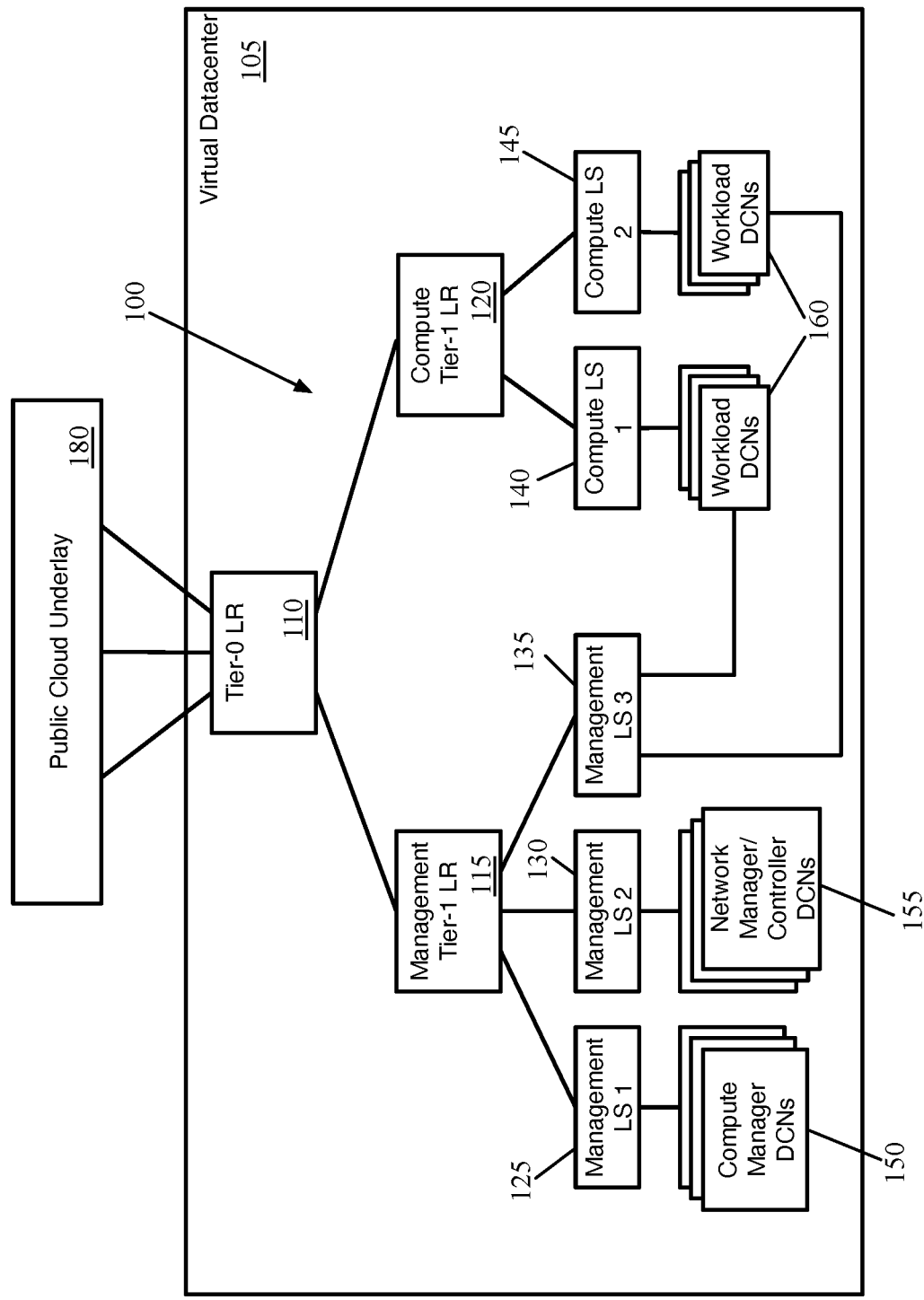
FIG. 1 conceptually illustrates a tenant logical network for a virtual datacenter of some embodiments.

FIG. 1 conceptually illustrates a tenant logical network 100 for a virtual datacenter 105 of some embodiments. As shown, the logical network 100 of the virtual datacenter is defined to include a tier-0 (T0) logical router 110, a management tier-1 (T1) logical router 115, and a compute tier-1 (T1) logical router 120. The T0 logical router 110 (implemented in part as an edge gateway) handles traffic entering and exiting the virtual datacenter 105 (e.g., traffic sent to and from an on-premises datacenter, traffic sent to and from services provided by the public cloud provider, traffic between workloads at the virtual datacenter 105 and client devices connected to the public Internet, etc.). As shown, the T0 logical router 110 has multiple connections (i.e., multiple uplinks) to the underlay network 180 of the public cloud. In some embodiments, these different uplinks are used as interfaces for communicating different types of traffic with the public cloud underlay (i.e., traffic to and from different external entities).

In addition, in some embodiments, some or all traffic between the management portion of the logical network 100 and the network endpoint workload data compute nodes (DCNs) is sent through the T0 logical router 110 (e.g., as a logical path between the management T1 logical router 115 and the compute T1 logical router 120). The T0 logical router 110 may also be defined to provide certain services for data traffic that it processes (e.g., with different services defined for traffic with different external entities by defining different services on different uplinks).

The management and compute T1 logical routers 115 and 120 are sometimes referred to as the management gateway and compute gateway. In some embodiments, a typical virtual datacenter is defined with these two T1 logical routers connected to a T0 logical router, which segregates the management network segments from the compute network segments to which workload DCNs connect. In general, public network traffic from external client devices would not be allowed to connect to the management network but would (in certain cases) be allowed to connect to the compute network (e.g., if the compute network includes web servers for a public-facing application). Each of the T1 logical routers 115 and 120 may also apply services to traffic that it processes, whether that traffic is received from the T0 logical router 110 or received from one of the network segments underneath the T1 logical router.

In this example, the virtual datacenter logical network 100 includes three management logical switches 125-135 (also referred to as network segments) and two compute logical switches 140-145. One or more compute manager DCNs 150 connect to the first management logical switch 125 and one or more network manager and controller DCNs 155 connect to the second management logical switch 130. The DCNs shown here may be implemented in the public cloud as virtual machines (VMs), containers, or other types of machines, in different embodiments. In some embodiments, multiple compute manager DCNs 150 form a compute manager cluster connected to the logical switch 125, while multiple network manager DCNs 155 form a management plane cluster and multiple network controller DCNs 155 form a control plane cluster (both of which are connected to the same logical switch 130).

The virtual datacenter 105 also includes workload DCNs 160. These DCNs can host applications that are accessed by users (e.g., employees of the enterprise that owns and manages the virtual datacenter 105), external client devices (e.g., individuals accessing a web server through a public network), other DCNs (e.g., in the same virtual datacenter or different datacenters, such as an on-premises datacenter), or services provided by the public cloud. The workload DCNs 160 in this example connect to two logical switches 140 and 145 (e.g., because they implement different tiers of an application, or different applications altogether). These DCNs 160 can communicate with each other, with workload DCNs in other datacenters, etc. via the interfaces connected to these compute logical switches 140 and 145. In addition, in some embodiments (and as shown in this example), the workload DCNs 160 include a separate interface (e.g., in a different subnet) that connects to a management logical switch 135. The workload DCNs 160 communicate with the compute and network management DCNs 150 and 155 via this logical switch 135, without requiring this control traffic to be sent through the T0 logical router 110.

Figure 2:
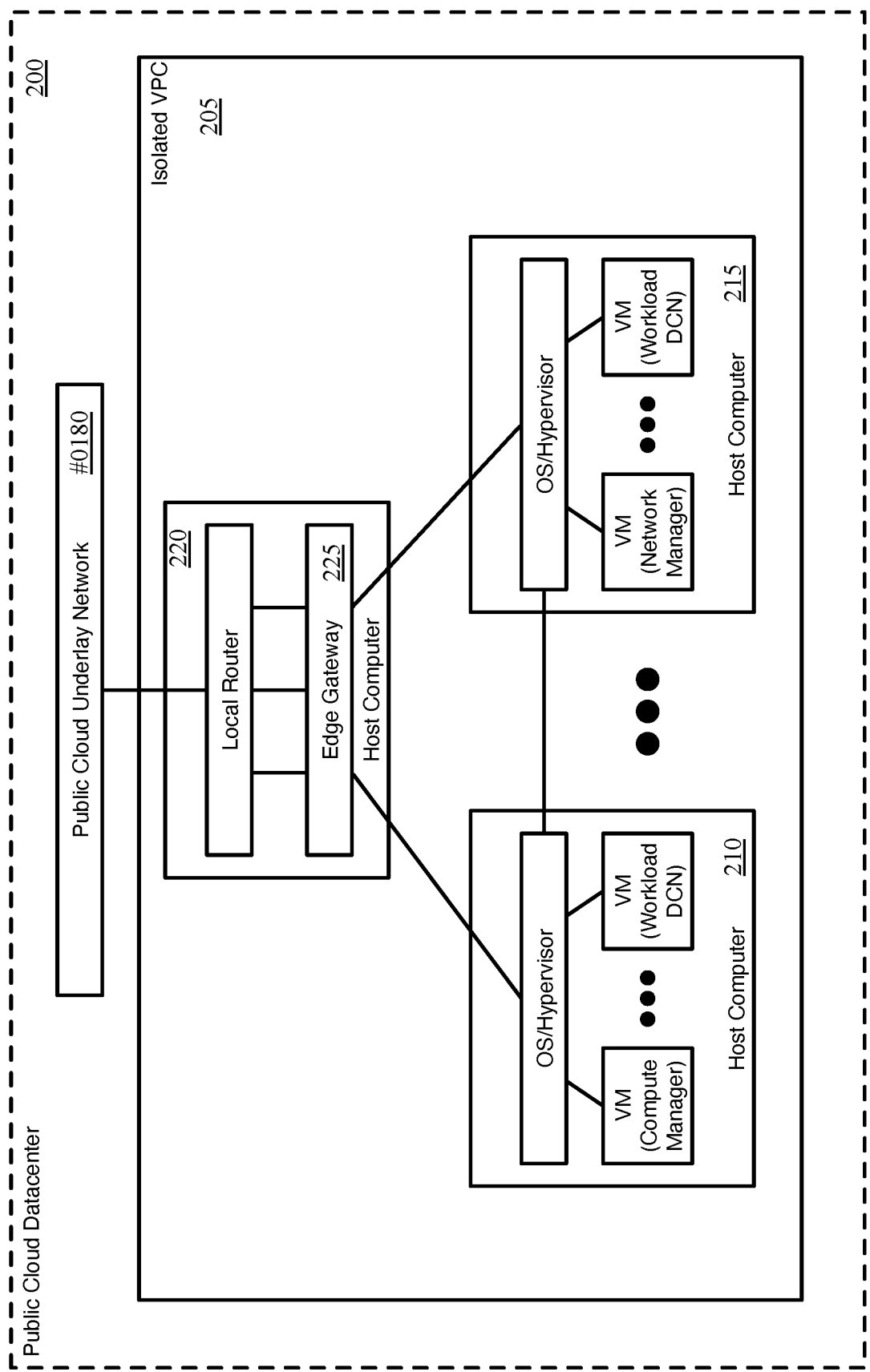
FIG. 2 conceptually illustrates the physical implementation of the virtual datacenter in a public cloud datacenter according to some embodiments.

FIG. 2 conceptually illustrates the physical implementation of the virtual datacenter 105 in a public cloud datacenter 200 according to some embodiments. As mentioned above, some embodiments implement a virtual datacenter such as that shown in FIG. 1 within a VPC of a public cloud datacenter. This figure shows that the virtual datacenter 105 is implemented in an isolated VPC 205 of the public cloud datacenter 200. In some embodiments, this VPC 205 is allocated not just a set of VMs or other DCNs that execute on host computers managed by the public cloud provider and potentially shared with other tenants of the public cloud, but rather a set of host computers 210-220 of the public cloud datacenter 200. This allows the management DCNs to manage the hypervisors and other software of the host computers 210-220 (e.g., so that these hypervisors implement the virtual datacenter logical network 100).

In different embodiments, the entire virtual datacenter may be implemented on a single host computer of the public datacenter 200 (which may host many VMs, containers, or other DCNs) or multiple different host computers. As shown, in this example, at least two host computers 210 and 215 execute workload and/or management VMs. Another host computer 220 executes an edge gateway 225 (e.g., as a VM, within a datapath, etc.). In some embodiments, this edge gateway 225 implements a centralized component of the T0 logical router, such that all traffic between any external networks and the virtual datacenter is processed by the gateway datapath 225. Additional details regarding logical routers and their implementation can be found in U.S. Pat. No. 9,787,605, which is incorporated herein by reference.

The edge gateway 225 connects to a local router that is implemented in the hypervisor of the host computer 220 in some embodiments. This local router provides routing between the edge gateway uplinks and the public cloud underlay network 180. Though not shown, in some embodiments both an active edge gateway and a standby edge gateway are implemented in the virtual datacenter (e.g., on two different host computers).

Figure 3:
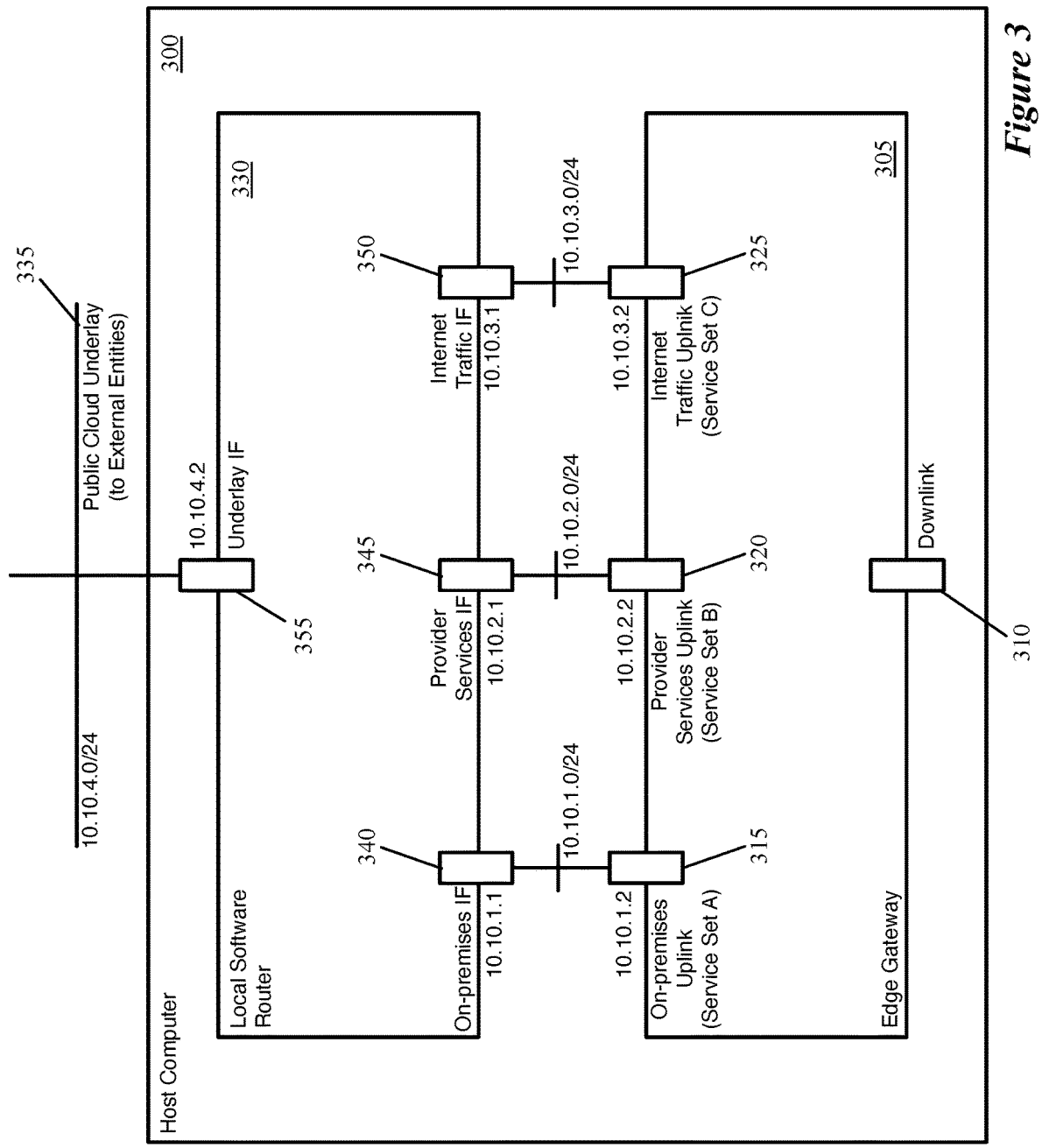
FIG. 3 conceptually illustrates a host computer hosting an edge gateway.

FIG. 3 conceptually illustrates a host computer 300 hosting an edge gateway 305 in more detail. As noted, the virtual datacenter of some embodiments includes two edge gateways (e.g., on two separate host computers), with one as an active edge gateway and the other as a standby edge gateway. In some such embodiments, the host computers on which the active and standby edge gateways execute have a similar structure to that shown in the figure.

The edge gateway 305 is a VM, container, etc. in some embodiments. This edge gateway 305 may execute a set of virtual switches and/or virtual routers, a DPDK-based datapath, a single flow-based forwarding element (e.g., Open vSwitch), or other forwarding element that enables the edge gateway to perform forwarding for multiple logical elements in addition to performing any services associated with those logical elements (e.g., firewall, VPN, NAT, etc.). As shown, the edge gateway 305 includes four interfaces: one downlink 310 and three uplinks 315-325. The downlink is used for communication with virtual datacenter workloads (e.g., network management components, logical network endpoints, etc.) on the same host computer 300 or other host computers of the virtual datacenter.

Each of the uplinks 315-325 is used for sending data messages to and receiving data messages from a different external entity. Specifically, the first uplink 315 processes data traffic between the virtual datacenter workloads and one or more on-premises datacenters owned and/or managed by the public cloud tenant that owns the virtual datacenter. The second uplink 320 processes data traffic between the virtual datacenter workloads and one or more cloud provider services, such as storage services, authentication services, deep packet inspection services, and/or other services provided by the public cloud. Finally, the third uplink 325 processes data traffic between the virtual datacenter workloads and the public Internet. This could be traffic sent through the public Internet from various client devices or be used by the virtual datacenter workloads to contact other domains (e.g., other applications in other datacenters).

Some embodiments configure the multiple different uplinks for the edge gateway so that the edge gateway can perform different sets of services on the incoming and outgoing data traffic depending on the external entity with which the virtual datacenter workloads are communicating. For instance, VPN services might be used for communication with on-premises datacenter workloads, but not for communication with the provider services or Internet sources. Different firewall rules might be applied for the different external entities, and some embodiments perform source NAT (to convert the virtual datacenter workload network address to a public network address) for Internet traffic but not for cloud provider services data traffic or on-premises data traffic.

Each of the edge gateway uplinks 315-325 has a different network address and is on a different subnet in some embodiments. As shown, in this example, the on-premises uplink 315 is configured with an IP address of 10.10.1.2 and is connected to the subnet 10.10.1.0/24. The provider services uplink 320 is configured with an IP address of 10.10.2.2 and is connected to the subnet 10.10.2.0/24. Finally, the Internet traffic uplink 325 is configured with an IP address of 10.10.3.2 as is connected to the subnet 10.10.3.0/24.

A local software router 330 also executes on the host computer 300 (e.g., in virtualization software of the host computer 300) and processes data traffic between the edge gateway 305 and the public cloud underlay network 335. In some embodiments, the public cloud underlay network 335 is a layer-3 network (i.e., does not handle L2 traffic such as address resolution protocol (ARP) traffic, gratuitous ARP (GARP) traffic, etc.). As such, rather than a software virtual switch connecting to the underlay, a software router executing on the host computer 300 handles this communication. The edge gateway 305 does not communicate directly with the underlay 335 because the uplinks 315-325 are on their own respective subnets separate from the underlay and the underlay 335 would not necessarily be able to differentiate between traffic for the different uplinks. The local software router 330, as will be described, is configured to route traffic from different external entities to the different edge gateway uplinks 315-325.

The local software router 330 has three interfaces 340-350 that correspond to the three edge gateway uplinks 315-325. Each of these interfaces is on the same subnet as the corresponding edge gateway interface: the on-premises interface 340 of the router 330 is configured with an IP address of 10.10.1.1, the cloud provider services interface 345 is configured with an IP address of 10.10.2.1, and the public Internet traffic interface 350 is configured with an IP address of 10.10.3.1. The local software router 330 also has a single interface 355 to the public cloud underlay 335, which is on the same subnet as that underlay (i.e., as the underlay router(s)). In this example, the underlay interface 355 is configured with an IP address of 10.10.4.2, with the underlay having a subnet 10.10.4.0/24.

Typically, the virtual datacenter workloads, on-premises datacenter workloads, and public cloud provider services each have their own separate associated sets of network addresses. The logical network within the virtual datacenter has one or more subnets (e.g., a different subnet for each logical switch within the logical network) that are used to communicate with the public cloud provider services and the on-premises datacenter workloads. The on-premises datacenter workloads have their own subnets and the cloud provider services are also typically assigned network addresses in one or more separate subnets. Network addresses outside of these subnets can be assumed to be associated with public Internet traffic.

When the edge gateway 305 receives traffic from the virtual datacenter workloads directed to any of these various external entities, the edge gateway 305 routes the traffic to the local router via the interface 315-325 associated with the destination address. That is, the edge gateway routing table routes data messages having destination addresses associated with the virtual datacenter workloads via the downlink 310 (i.e., to a particular host computer in the virtual datacenter via the downlink 310), data messages having destination addresses associated with the on-premises datacenter via the uplink 315 (i.e., to the local router interface 340 as a next hop via the uplink 315), data messages having destination addresses associated with the cloud provider services to the uplink 320 (i.e., to the local router interface 345 as a next hop via the uplink 320), and data messages destined for the public Internet (e.g., using a default route) via the uplink 325 (i.e., to the local router interface 350 as a next hop via the uplink 325). By routing each type of outgoing data through the associated uplink 315-325, the edge gateway 305 applies the appropriate set of services (e.g., firewall, source network address translation (NAT), VPN, etc.) on the traffic. The local router 330 then uses its own routing table to route the outgoing traffic to the cloud provider underlay network via the interface 355.

As noted above, it is often the case that the edge gateway 305 applies source NAT to traffic sent from the virtual datacenter to endpoints via the public Internet (i.e., the uplink 325 is configured to perform source NAT on this traffic), but no such address translation is applied to traffic sent to either the on-premises datacenter or public cloud provider services (i.e., the uplinks 315 and 320 are not configured to perform source NAT on their traffic). For routing of the outbound traffic, this is not an issue. The data messages are sent to the local router 330, which routes them to the public cloud underlay 335 via the interface 355 based on their destination addresses. However, when these external entities send return traffic to the virtual datacenter, they may have the same destination address (or sets of destination addresses) but need to be routed to different interfaces of the edge gateway 305 so that the edge gateway can apply the appropriate set of services to different data messages. That is, the public cloud provider service and an on-premises workload might both send data messages to the same virtual datacenter workload using the same destination network address. The public cloud underlay would route this traffic to the interface 355 of the local software router 330, but this router would not be able to differentiate as to which of the edge gateway uplink interfaces should receive which data message using standard routing based on the destination network address.

Thus, some embodiments configure the local router to route some data messages (specifically, incoming data messages directed to the virtual datacenter workloads) based on the source address of the data messages rather than only the destination address. These routes, in some embodiments, specify that any data message received at the local router that (i) has a destination address associated with the virtual datacenter workloads and (ii) has a source address associated with a particular external entity is routed to the edge gateway interface associated with that external entity.

Figure 4:
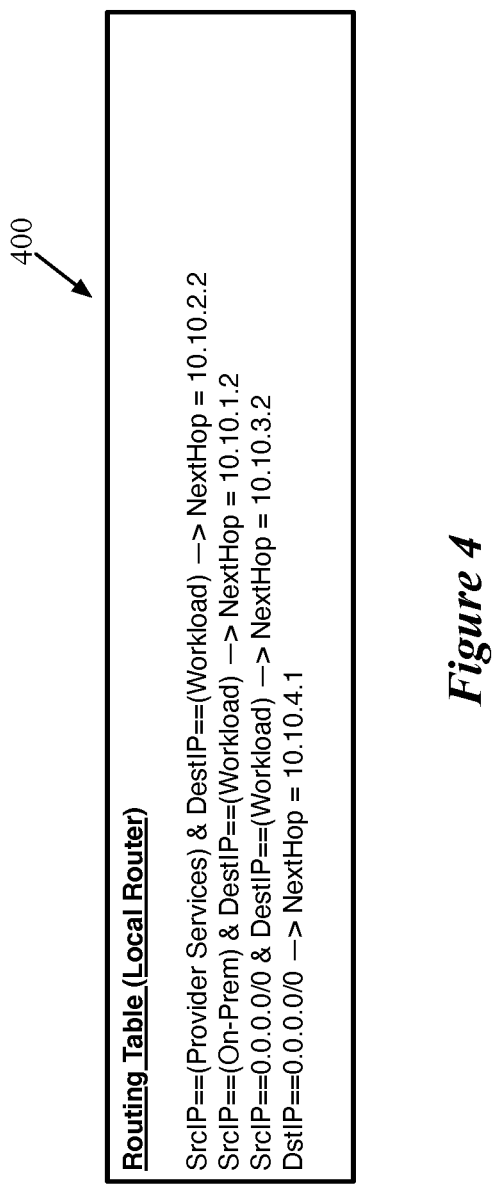
FIG. 4 conceptually illustrates a portion of the routing table configured for a local router in some embodiments.

FIG. 4 conceptually illustrates a portion of the routing table 400 configured for the local router 330 in some embodiments. As shown, some of the routes in the routing table 400 are policy-based routes (i.e., routes that do not match only on destination network address) that match at least partly on the source network address of a received data message. The first route specifies that any data message received at the local router that (i) has a source address associated with the cloud provider services and (ii) has a destination address associated with the virtual datacenter workloads is routed to a next hop of 10.10.2.2 (i.e., the edge gateway interface address associated with cloud provider services traffic). Though not shown, in some embodiments the routing table also specifies that any traffic directed to 10.10.2.0/24 is output via the cloud provider services interface 345. It should be noted that this may represent multiple routes if there are multiple addresses or subnets associated with the cloud provider services and/or the virtual datacenter workloads.

The second route specifies that any data message received at the local router that (i) has a source address associated with the on-premises datacenter and (ii) has a destination address associated with the virtual datacenter workloads is routed to a next hop of 10.10.1.2 (i.e., the edge gateway interface address associated with on-premises datacenter traffic). Though not shown, in some embodiments the routing table also specifies that any traffic directed to 10.10.1.0/24 is output via the on-premises interface 340. Like the first route, this second route may represent multiple routes if there are multiple addresses or subnets associated with the on-premises datacenter and/or the virtual datacenter workloads.

The third route specifies that any data message received at the local router that has a destination address associated with the virtual datacenter workloads and any source address is routed to a next hop of 10.10.3.2 (i.e., the edge gateway interface address associated with public Internet traffic). Though not shown, in some embodiments the routing table also specifies that any traffic directed to 10.10.3.0/24 is output via the Internet traffic interface 350. This third route may also represent multiple routes if there are multiple addresses or subnets associated with the virtual datacenter workloads. In some embodiments, this is a different destination address than used for the first two routes because traffic from public Internet sources is sent to a public IP address and translated by the edge gateway. In addition, though priorities are not shown in the routing table, it should be understood that the third route is configured with a lower priority than the first two routes so that data traffic directed to the workloads will be sent to one of the first two interfaces (for cloud provider services traffic or on-premises traffic) if matching either of those source addresses and to the public Internet interface for any other source addresses. By using the source-based routing, data traffic from different sources can be directed to the appropriate edge gateway interface and therefore have the appropriate services (firewall, NAT, VPN, etc.) applied.

Finally, the routing table 400 includes a default route routing data messages with any other destination addresses to a next hop of 10.10.4.1 (i.e., to be output via the interface 355 to a next hop of a router on the public cloud underlay network). This is the output for any traffic sent from the virtual datacenter workloads to the various external entities. In this way, the local router 330 operates like a multiplexer for outgoing traffic from multiple different interfaces of the edge gateway and a demultiplexer for incoming traffic (spreading this traffic to the different interfaces of the edge gateway).

Figure 5:
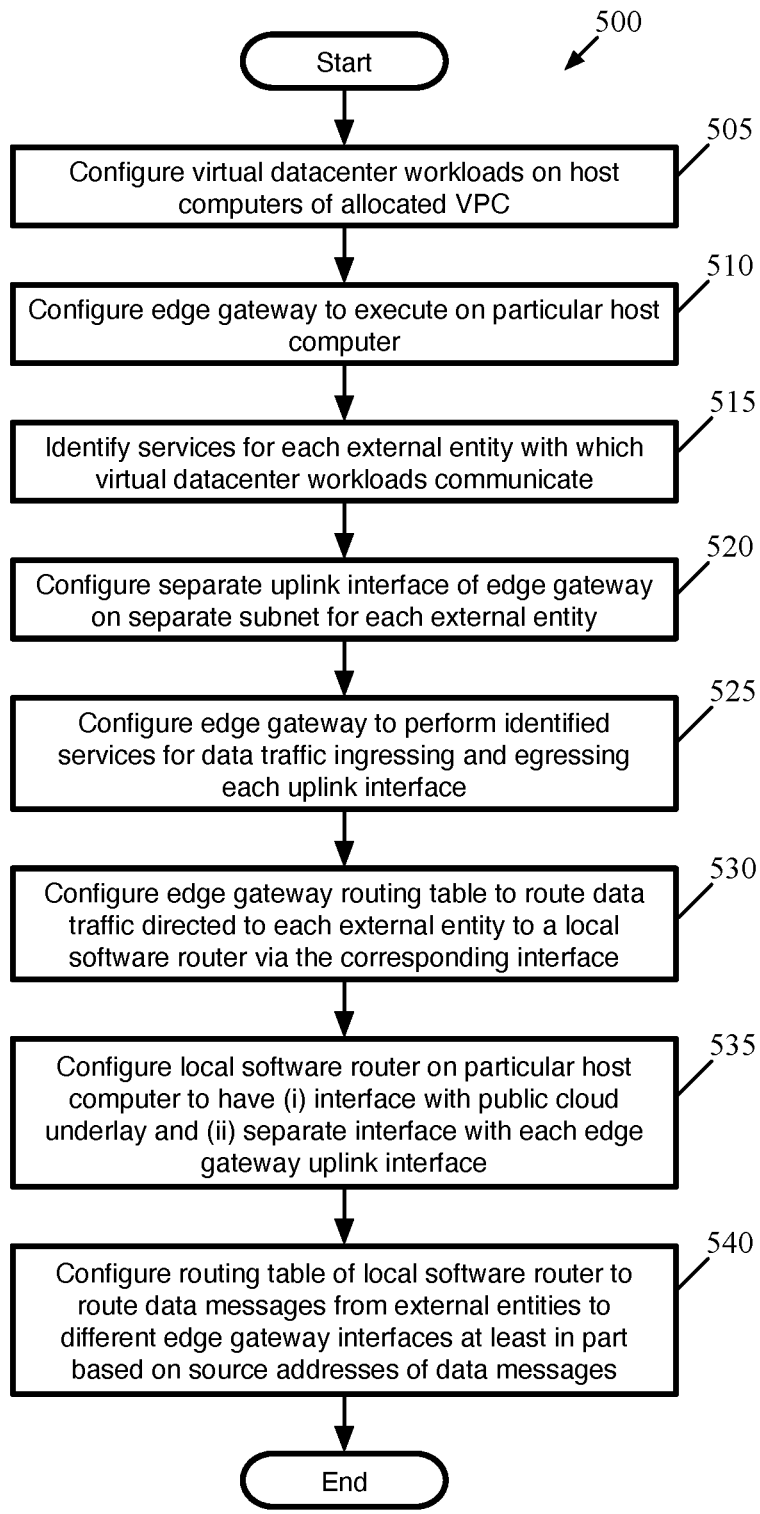
FIG. 5 conceptually illustrates a process for configuring a virtual datacenter and the routing for data traffic that the virtual datacenter exchanges with external entities.

FIG. 5 conceptually illustrates a process 500 for configuring a virtual datacenter and the routing for data traffic that the virtual datacenter exchanges with external entities. The process 500 is performed in part by the network manager and controller clusters (as well as the compute cluster) in the virtual datacenter in some embodiments. It should be understood that the process 500 is a conceptual process, and that (i) the operations shown may not be performed in the order shown and (ii) different network and/or compute managers or controllers may perform some of the different operations. For instance, in some embodiments the edge gateway (and the routing table in the edge gateway) are configured by a first component (e.g., a cloud service application) while the local software router (and the routing table of the local software router) are configured by a second component (e.g., an agent running on the host computer on which the edge gateway and local software router execute). In some such embodiments, the second component also configures the underlay router(s). These components may be network management system components (e.g., they receive the configuration information from the network manager and/or controllers in the virtual datacenter).

As shown, the process 500 begins by configuring (at 505) virtual datacenter workloads on host computers of a VPC allocated to the tenant (i.e., the VPC allocated for hosting the virtual datacenter). As described above, these host computers are segregated and allocated solely for the virtual datacenter in some embodiments, such that the compute and/or network manager/controller applications have access to the virtualization software of the host computers. In some embodiments, a compute controller configures various VMs and/or other workloads to execute on the host computers. In addition, in some embodiments, a network manager configures the virtualization software on these host computers to perform logical networking for data traffic sent to and from these workloads.

The process 500 also configures (at 510) an edge gateway to execute on a particular host computer of the VPC. As indicated, this edge gateway is a VM in some embodiments, but may also operate as a container or a datapath on a bare metal computer in other embodiments. In some embodiments, the edge gateway executes on a separate host computer from the other virtual datacenter workloads, while in other embodiments the edge gateway executes on the same host computer as at least a subset of the workloads. In addition, while the process 500 describes the configuration of a single edge gateway, it should be understood that in some embodiments one active edge gateway and one or more standby edge gateways are actually configured, often on different host computers for redundancy. In this case, the active and standby gateways are mostly configured in the same manner, but other forwarding elements (e.g., on the other host computers) are configured to forward the relevant traffic ingressing and egressing the virtual datacenter to the host computer with the active edge gateway.

The process 500 also identifies (at 515) services for each external entity with which the virtual datacenter workloads communicate. In some embodiments, these services are determined based on user-specified configuration of different uplinks for the edge gateway. As noted, the services can include VPN, firewall, NAT, load balancing, or other services. The external entities may include one or more sets of cloud provider services (e.g., storage, etc.).

The process 500 then configures (at 520) a separate uplink interface of the edge gateway on a separate subnet for each external entity. These subnets, as shown in FIG. 3, are not the subnet of the external entity, but rather are independent private subnets used by the edge gateway to forward data traffic to and receive data traffic from the local router that is also configured on the particular host computer with the edge gateway. The process 500 also configures (at 525) the edge gateway to perform the identified services for data traffic ingressing and egressing via each uplink interface.

The process 500 configures (at 530) a routing table for the edge gateway to route data traffic directed to each external entity to a local software router via the corresponding interface. In some embodiments, these are standard routes that match on the destination network address, rather than the policy-based routes used for the return direction traffic at the local software router. Each route for a set of network addresses associated with a particular external entity routes data traffic via one of the uplink interfaces of the edge gateway so that the edge gateway can perform the appropriate set of services on the data traffic.

Next, the process 500 configures (at 535) a local software router (e.g., a virtual router) on the particular host computer to have (i) an interface with the public cloud underlay and (ii) separate interfaces corresponding to each edge gateway uplink interface. Each of these latter interfaces is configured to be on the same subnet as the corresponding edge gateway uplink, while the former interface is configured to be on the same subnet as the public cloud underlay router to which the particular host computer connects.

Finally, the process 500 configures (at 540) the routing table of the local software router to route data messages from external entities (i.e., received from the public cloud underlay) to the different edge gateway interfaces at least in part based on source addresses of the data messages. The routing table 400 shown in FIG. 4 illustrates examples of these routes that match on (i) the destination address mapping to the virtual datacenter workloads and (ii) different source addresses corresponding to the different external entities. The routing table is also configured to route egressing traffic to the public cloud underlay network (e.g., using a default route).

Figure 6:
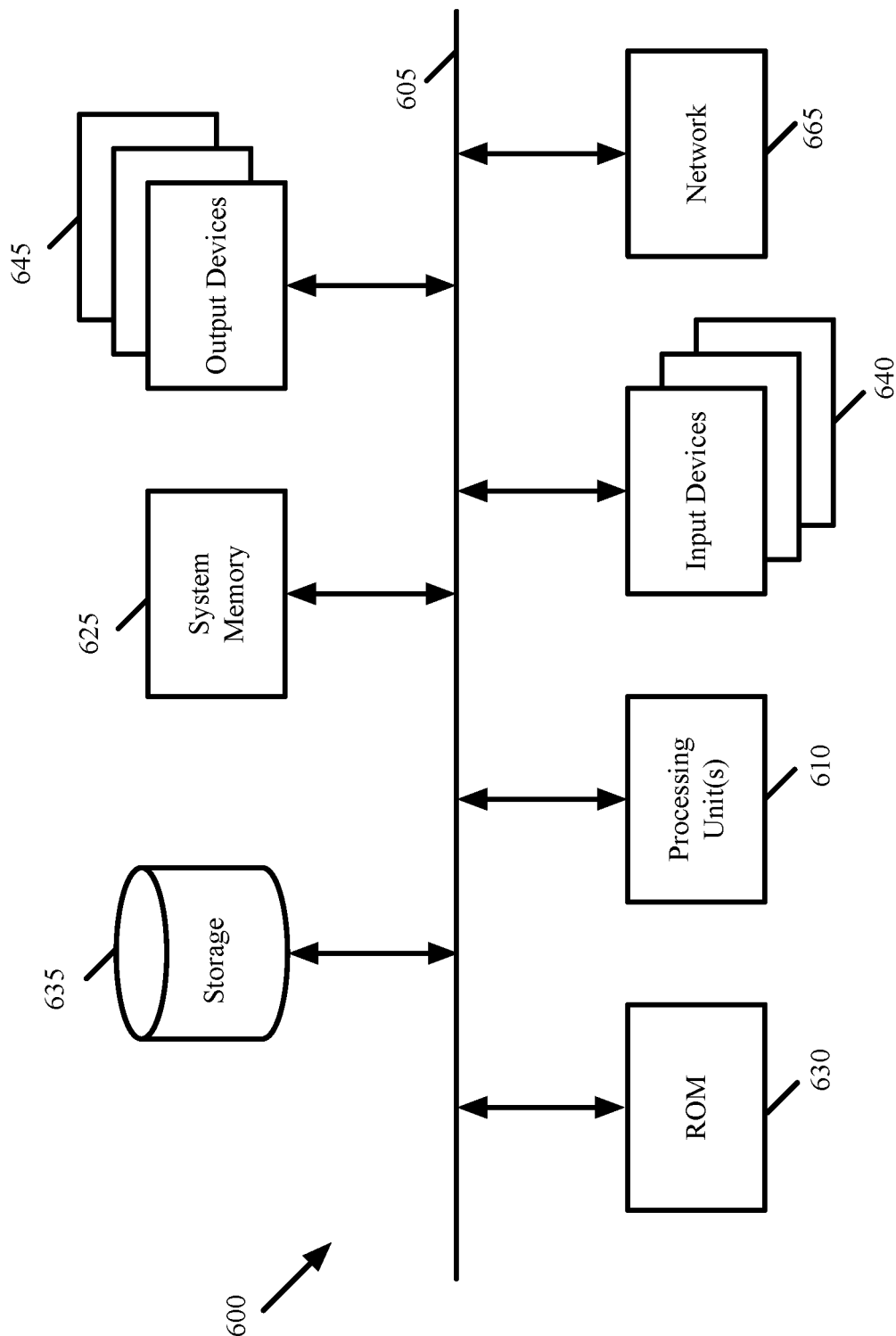
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the electronic system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments.

The read-only-memory (ROM) 630 stores static data and instructions that are needed by the processing unit(s) 610 and other modules of the electronic system. The permanent storage device 635, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such a random-access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the electronic system. The input devices 640 include alphanumeric keyboards and pointing devices (also called "cursor control devices"). The output devices 645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples electronic system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of electronic system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs).

However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method comprising:
configuring a virtual datacenter on a set of host computers in a public cloud, the virtual datacenter comprising (i) a set of workloads executing on the host computers and (ii) an edge gateway executing on a particular host computer for handling data traffic between the workloads and at least two different external entities having different sets of network addresses, wherein the set of workloads uses a same set of network addresses to communicate with the at least two different external entities;
configuring a router to execute on the particular host computer to route data messages between the edge gateway and an underlay network of the public cloud, the router having at least two different respective interfaces for exchanging data messages with the edge gateway, wherein each respective router interface corresponds to a respective interface of the edge gateway, the respective edge gateway interfaces enabling the edge gateway to perform different respective sets of services on data messages between the workloads and the respective external entities; and
configuring the router to route data messages received from the external entities via the underlay network and addressed to the workloads based on source network addresses of the data messages.

2. The method of claim 1, wherein the virtual datacenter workloads comprise (i) a set of network management components and (ii) a set of network endpoints connected by a logical network that is managed by the network management components of the virtual datacenter.

3. The method of claim 1, wherein:
the set of workloads is a first set of workloads; and
the external entities comprise (i) a second set of workloads at an on-premises datacenter and (ii) a set of cloud provider services.

4. The method of claim 3, wherein the external entities further comprise a set of public internet endpoints.

5. The method of claim 1, wherein:
the network addresses of the set of workloads are not translated for communication with first and second external entities; and
the network addresses of the set of workloads are translated by the edge gateway for communication with a third external entity.

6. The method of claim 1, wherein (i) data messages received from a first external entity directed to a particular workload and (ii) data messages received from a second external entity directed to the particular workload have a same destination address.

7. The method of claim 1, wherein the router is configured to (i) route data messages sent from the first external entity to a first interface of the edge gateway based on said data messages having source addresses associated with the first external entity and (ii) route data messages sent from the second external entity to a second interface of the edge gateway based on said data messages having source addresses associated with the second external entity.

8. The method of claim 7, wherein the router is configured to route data messages sent from a third external entity to a third interface of the edge gateway using a default route when (i) source addresses of said data messages are not associated with either the first or second external entities and (ii) destination addresses of said data messages are associated with the set of workloads.

9. The method of claim 7, wherein the edge gateway performs a first set of services on the data messages routed to the first interface and a second set of services on the data messages routed to the second interface.

10. The method of claim 1, wherein a set of services associated with a first edge gateway interface comprises at least one of firewall services and virtual private network (VPN) services.

11. The method of claim 1, wherein:
configuring the virtual datacenter comprises directing a first network management application to configure the edge gateway; and
configuring the router comprises directing a second network management application to configure the router.

12. A method comprising:
configuring a virtual datacenter on a set of host computers in a public cloud, the virtual datacenter comprising (i) a set of workloads executing on the host computers, (ii) an active edge gateway executing on a first host computer for handling data traffic between the workloads and at least two different external entities having different sets of network addresses, and (iii) a standby edge gateway executing on a second host computer for handling data traffic between the workloads and the different external entities if the active edge gateway fails;
configuring a first router to execute on the first host computer to route data messages between the active edge gateway and an underlay network of the public cloud, the first router having at least two different respective interfaces for exchanging data messages with the active edge gateway, wherein each respective router interface corresponds to a respective interface of the active edge gateway, the respective active edge gateway interfaces enabling the active edge gateway to perform different respective sets of services on data messages between the workloads and the respective external entities;
configuring the first router to route data messages received from the external entities via the underlay network and addressed to the workloads based on source network addresses of the data messages;
configuring a second router to execute on the second host computer to route data messages between the standby edge gateway and the underlay network of the public cloud, the second router having at least two different respective interfaces for exchanging data messages with the standby edge gateway, wherein each respective interface of the second router corresponds to a respective interface of the standby edge gateway; and
configuring the second router to route data messages received from the external entities via the underlay network and addressed to the workloads based on source network addresses of the data messages.

13. The method of claim 12, wherein:
the underlay network is configured to route data messages addressed to the workloads to the first router executing on the first host computer; and
if the active edge gateway fails, the underlay network is subsequently configured to route data messages addressed to the workloads to the second router executing on the second host computer.

14. A non-transitory machine-readable medium storing a program for execution by at least one processing unit, the program comprising sets of instructions for:
configuring a virtual datacenter on a set of host computers in a public cloud, the virtual datacenter comprising (i) a set of workloads executing on the host computers and (ii) an edge gateway executing on a particular host computer for handling data traffic between the workloads and at least two different external entities having different sets of network addresses, wherein the set of workloads uses a same set of network addresses to communicate with the at least two different external entities;
configuring a router to execute on the particular host computer to route data messages between the edge gateway and an underlay network of the public cloud, the router having at least two different respective interfaces for exchanging data messages with the edge gateway, wherein each respective router interface corresponds to a respective interface of the edge gateway, the respective edge gateway interfaces enabling the edge gateway to perform different respective sets of services on data messages between the workloads and the respective external entities; and
configuring the router to route data messages received from the external entities via the underlay network and addressed to the workloads based on source network addresses of the data messages.

15. The non-transitory machine-readable medium of claim 14, wherein:
the set of workloads is a first set of workloads; and
the external entities comprise (i) a second set of workloads at an on-premises datacenter, (ii) a set of cloud provider services, and (iii) a set of public internet endpoints.

16. The non-transitory machine-readable medium of claim 14, wherein:
the network addresses of the set of workloads are not translated for communication with first and second external entities; and
the network addresses of the set of workloads are translated by the edge gateway for communication with a third external entity.

17. The non-transitory machine-readable medium of claim 16, wherein:
data messages received from the first external entity directed to a particular workload and data messages received from the second external entity directed to the particular workload have a same destination address; and
the router is configured to (i) route data messages sent from the first external entity to a first interface of the edge gateway based on said data messages having source addresses associated with the first external entity and (ii) route data messages sent from the second external entity to a second interface of the edge gateway based on said data messages having source addresses associated with the second external entity.

18. The non-transitory machine-readable medium of claim 17, wherein the router is configured to route data messages sent from a third external entity to a third interface of the edge gateway using a default route when (i) source addresses of said data messages are not associated with either the first or second external entities and (ii) destination addresses of said data messages are associated with the set of workloads.

19. The non-transitory machine-readable medium of claim 17, wherein the edge gateway performs a first set of services on the data messages routed to the first interface and a second set of services on the data messages routed to the second interface.

20. A non-transitory machine-readable medium storing a program for execution by at least one processing unit, the program comprising sets of instructions for:
configuring a virtual datacenter on a set of host computers in a public cloud, the virtual datacenter comprising (i) a set of workloads executing on the host computers, (ii) an active edge gateway executing on a first host computer for handling data traffic between the workloads and at least two different external entities having different sets of network addresses, and (iii) a standby edge gateway executing on a second host computer for handling data traffic between the workloads and the different external entities if the active edge gateway fails;

configuring a first router to execute on the first host computer to route data messages between the active edge gateway and an underlay network of the public cloud, the first router having at least two different respective interfaces for exchanging data messages with the active edge gateway, wherein each respective router interface corresponds to a respective interface of the active edge gateway, the respective active edge gateway interfaces enabling the active edge gateway to perform different respective sets of services on data messages between the workloads and the respective external entities;

configuring the first router to route data messages received from the external entities via the underlay network and addressed to the workloads based on source network addresses of the data messages;

configuring a second router to execute on the second host computer to route data messages between the standby edge gateway and the underlay network of the public cloud, the second router having at least two different respective interfaces for exchanging data messages with the standby edge gateway, wherein each respective interface of the second router corresponds to a respective interface of the standby edge gateway; and configuring the second router to route data messages received from the external entities via the underlay network and addressed to the workloads based on source network addresses of the data messages.

21. The non-transitory machine-readable medium of claim 20, wherein:

the underlay network is configured to route data messages addressed to the workloads to the first router executing on the first host computer; and if the active edge gateway fails, the underlay network is subsequently configured to route data messages addressed to the workloads to the second router executing on the second host computer.

* * * * *